(12) United States Patent
Cable et al.

(10) Patent No.: US 8,072,488 B2
(45) Date of Patent: Dec. 6, 2011

(54) HOLOGRAPHIC APPARATUS AND METHOD

(75) Inventors: Adrian James Cable, Cambridge (GB); Edward Buckley, Cambridge (GB)

(73) Assignee: Cambridge University Technical Services Limited, Cambridgeshire (GB)

( * ) Notice: Subject to any disclaimer, the term of this patent is extended or adjusted under 35 U.S.C. 154(b) by 1250 days.

(21) Appl. No.: 10/582,678

(22) PCT Filed: Dec. 15, 2004

(86) PCT No.: PCT/GB2004/005253
§ 371 (c)(1),
(2), (4) Date: Jan. 25, 2007

(87) PCT Pub. No.: WO2005/059660
PCT Pub. Date: Jun. 30, 2005

(65) Prior Publication Data
US 2007/0113012 A1 May 17, 2007

(30) Foreign Application Priority Data
Dec. 15, 2003 (GB) .................................. 0329012.9

(51) Int. Cl.
G03H 1/00 (2006.01)
G03H 1/08 (2006.01)
H04N 13/04 (2006.01)
(52) U.S. Cl. .................................. 348/60; 359/9; 348/51
(58) Field of Classification Search .................... 348/51, 348/60; 359/1, 9
See application file for complete search history.

(56) References Cited

U.S. PATENT DOCUMENTS

| 4,588,260 A | 5/1986 | Horner |
| 5,546,198 A | 8/1996 | Van Der Gracht et al. |
| 5,589,955 A * | 12/1996 | Amako et al. ................ 359/9 |
| 6,011,874 A | 1/2000 | Glueckstad et al. |
| 6,437,919 B1 | 8/2002 | Brown et al. |
| 6,456,421 B1 | 9/2002 | Chapnik et al. |
| 2001/0050787 A1 | 12/2001 | Crossland et al. |
| 2002/0190922 A1 | 12/2002 | Tsao |

FOREIGN PATENT DOCUMENTS

| KR | 10-2002-0069878 | 5/2002 |
| WO | WO 00/75698 A1 | 12/2000 |
| WO | WO 03/025680 A | 3/2003 |
| WO | WO 2005/059659 A2 | 6/2005 |

(Continued)

OTHER PUBLICATIONS

Ambs, P., et al., "Image Reconstruction Using Electrooptic Holography," *LEOS* 1:179-180 (2003).

(Continued)

*Primary Examiner* — Christopher S Kelley
*Assistant Examiner* — Chikaodili Anyikire
(74) *Attorney, Agent, or Firm* — Hamilton, Brook, Smith & Reynolds, P.C.

(57) ABSTRACT

The invention relates to a method of and apparatus for displaying a holographically generated video image having plural video frames. For each frame there is provided and computed (20) a respective sequential plurality of holograms. Each said plurality of holograms of the plural video frames are sequentially displayed on a diffractive element (12) for viewing the replay field thereof, and the noise variance of each frame is perceived as attenuated by averaging across said plurality of holograms.

10 Claims, 4 Drawing Sheets

FOREIGN PATENT DOCUMENTS

WO     WO 2005/059660 A2    6/2005
WO     WO 2005/059881 A2    6/2005

OTHER PUBLICATIONS

Fienup, J.R., "Phase Retrieval Algorithms: A Comparison," *Applied Optics*, 21(15):2758-2769 (1982).

Gerchberg, R.W., et al., "A Practical Algorithm for the Determination of Phase from Image and Diffraction Plane Pictures," *OPTIK*, 35(2):237-246 (1972).

Wilkinson, T.D., et al., "Dynamic Asymmetric Binary Holograms Using a Ferroelectric LZiquid Crystal Spatial Light Modulator," *Optics Communications* 109:222-226 (1994).

Amako, J., et al., "Speckle-Noise Reduction on Kinoform Reconstruction Using a Phase-Only Spatial Light Modulator," Applied Optics, 34(17):3165-3171 (1995).

Ferri, Lucilla Croce, et al., "Visualization of 3D information with Digital Holography Using Laser Printers," Computers & Graphics, 25:309-321 (2001).

Sato, K., "Characteristics of Kinoform by LCD and its Application to Display the Animated Color 3D Image," Practical Holography VIII, 2176:42-49 (1994).

Yang, S., et al., "Error Reduction of Quantized Kinoforms by means of Increasing the Kinoform Size," *Applied Optics Opt. Soc. America USA*, 37(29):6931-6936 (Oct. 10, 1998).

Huebschman, M., et al., "Dynamic Holographic 3D Image Projection," *Optics Express*, 11(5):437-445 (Mar. 10, 2003).

Horikoshi, T., et al., "Time-Sharing Display Approach Using Liquid Crystal Light Valve and a Photorefractive Crystal for Electroholography," *Proceedings of the SPIE*,3637:64-71 (Jan. 1999).

Bauchert, K., et al,. "Advances in Liquid Crystal Spatial Light Modulators," *Optical Pattern Recognition XIII, Proceedings of the SPIE*, 4734:35-43 (2002), month of publication not available.

Mu, Renwang,, et al., "Transmissive Kinoform Fabricated Use of Binary Optical Technique," *Optical Information Processing Technology, Proceedings of the SPIE*, 4929:494-498 (2002), month of publication not available.

Ambs, P., et al., "Dynamic Diffractive Optical Elements Displayed on Spatial Light Modulators," *Sixth International Conference on Correlation Optics, Proceedings of SPIE*, 5477:293-303 (2004), month of publication not available.

International Search Report issued in PCT Application No. PCT/GB2004/005257, date of mailing Aug. 3, 2005.

Krueger, S., et al., "Liquid Crystal Display as Dynamic Diffractive Element," *Proc. SPIE*, 4294: 84-91 (2001).

"Development of Computer-Generated Hologram Technique," *Optics 2001*, vol. 30, No. 3, pp. 156-166.

Kato, M., "Speckle Reduction in Holography," *Optics 1975*, vol. 4, No. 6, pp. 263-277.

English Language Translation of Official Action for Application No. 2006-544545, Date Mailed: Jan. 7, 2011, which satisfies the "concise explanation" requirement (for non-English references) for references C16 and C17 under 37 CFR 1.98(a)(3), 2 pages.

\* cited by examiner

HOLOGRAPHIC APPARATUS AND METHOD

RELATED APPLICATIONS

This application is the U.S. National Stage of International Application No. PCT/GB2004/005253, filed Dec. 15, 2004, published in English, and claims priority under 35 U.S.C. § 119 or 365 to Great Britain Application No. 0329012.9, filed 15 Dec. 2003.

TECHNICAL FIELD

The present invention relates to a method of displaying a holographically generated video image composed of plural video frames, and to apparatus constructed and arranged to display a holographically generated video image having plural video frames.

BACKGROUND

For the sake of clarity, the term "video data" is not limited to data representing any particular type of image content and is intended to include data that is representative of one or more still images, wherein the data are periodically or regularly refreshed.

Holographically generated 2D video images are known to possess significant advantages over their conventionally projected counterparts, especially in terms of definition and efficiency. However, the computational complexity of the current hologram generation algorithms preclude their use in real-time applications. Furthermore, even if the existing algorithms were fast enough, the images generated by them are not of sufficient quality for use in a display application.

Traditionally, hologram generation algorithms may proceed by finding holograms that minimise the mean-squared error (MSE) between the desired image and the image produced (the replay field, or RPF) when the hologram is illuminated with coherent light. The inventors have shown that human subjects consider lower signal and noise variance in the RPF to be far more important in display applications. Using this result, a new algorithm optimised to the psychometrically-determined perceptual measure of image quality has been developed.

Holographically generated images may be formed by light leaving a device exhibiting a phase-modulating effect upon light incident upon the device. Typically the device is a spatial light modulator (SLM) and has a field of addressable phase-modulating elements. In some SLMs the phase-modulating elements are a linear or one-dimensional array of elements; in others a two dimensional array may be provided. For simplicity many SLMs have a regular 2-D array of like, generally square, phase-modulating elements; it is however not necessary for the phase-modulating elements to be alike in size or shape.

In general the phase-modulating elements of SLMs are often referred to as "pixels", and the elements themselves as "pixellated". The terms are used interchangeably herein. It is not intended herein, when the term "pixel" is used, that any directly viewable picture content is to be seen on the elements concerned.

An object of some embodiments of the invention is to achieve high quality real-time holographic video projection.

An object of some embodiments of the invention is to provide an algorithm for forming a CGH, which algorithm involves a low number of computationally intensive steps.

An object of some embodiments of the invention is to provide a fast algorithm for forming a CGH, which algorithm can be implemented on relatively unsophisticated hardware, such as is currently commercially available.

SUMMARY

According to one aspect of the invention there is provided a method of displaying a holographically-generated video image composed of plural video frames, the method comprising providing for each frame period a respective sequential plurality of holograms and displaying the holograms of the plural video frames for viewing the replay field thereof, whereby the noise variance of each frame is perceived as attenuated by averaging across said plurality.

In an embodiment the providing step comprises generating each hologram by implementing an algorithm having a single computationally intensive step.

In an embodiment the single step is a Fourier transform step.

In an embodiment the algorithm is arranged, for each said plurality of pixellated holograms, to a) form first data having amplitude equal to the amplitude of the desired pixel and identically distributed uniformly random phase; b) inverse Fourier transform the first data to provide second data; c) shift the second data in the real direction in the complex plane sufficiently to form a third data set in which the phase of each data point is small; d) form as a fourth data set the magnitude of the third data set; and e) binarise the fourth data set to form a fifth data set for display as a said hologram.

In an embodiment the step of binarisation comprises thresholding about the median of the fourth data set whereby the fifth data set has dc balance and low reconstruction error.

In another embodiment the step of binarisation comprises thresholding the fourth data set about zero.

In an embodiment the display device comprises a spatial light modulator having a pixellated phase mask imposing phase shifts of substantially 0 and $\pi/2$, wherein the effect of the display device showing a binary hologram in co-operation with the two-phase phase mask simulates a four-phase modulation, wherein each pixel has one of the values $[1,j,-1,-j]$. Other phase shifts would be possible provided a difference of substantially $\pi/2$ or $n\pi/2$ is present between the two levels.

In an embodiment the pixel values of the phase mask are spatially random.

In another embodiment, the pixel values of the phase mask are decided deterministically.

In an embodiment step b) comprises inverse Fourier transforming and applying the phase mask values to the first data to provide the second data.

An alternative family of embodiments uses a Fresnel transformation instead of a Fourier transform.

Some embodiments are restricted to 2D holograms; others provide 3D.

According to another aspect of the invention there is provided apparatus constructed and arranged to display a holographically-generated video image having plural video frames, the apparatus having processing means arranged to provide for each frame period a respective sequential plurality of holograms and a display device arranged to receive the sequential plurality of holograms of each frame and to display the holograms of the plural video frames of the video image for viewing the replay field thereof, whereby the noise variance of each frame is perceived as attenuated by averaging across said plurality of holograms.

In an embodiment the processing means is arranged to generate each said hologram by implementing an algorithm having a single computationally intensive step.

In an embodiment the single step is a Fourier transform step.

In an embodiment the algorithm is arranged, for each said plurality of pixellated holograms, to a) form first data having amplitude equal to the amplitude of the desired image pixels and identically distributed uniformly random phase; b) inverse Fourier transform the first data to provide second data; c) shift the second data in the real direction in the complex plane sufficiently to form a third data set in which the phase of each data point is small; d) form as a fourth data set the magnitude of the third data set; and e) binarise the fourth data set to form a fifth data set for display as a said hologram.

In an embodiment the step of binarisation comprises thresholding about the median of the fourth data set whereby the fifth data set has dc balance and low reconstruction error.

In another embodiment, the thresholding of the fourth data set is performed about zero.

In an embodiment the display device comprises a spatial light modulator having a pixellated phase mask imposing phase shifts of substantially 0 and $\pi/2$, wherein the effect of the display device showing a binary hologram in co-operation with the two-phase phase mask simulates a four-phase modulation, wherein each pixel has one of the values [1, j, −1, −j]. Other phase shifts would be possible provided a difference of substantially $\pi/2$ or $n\,\pi/2$ is present between the two levels.

In an embodiment the pixel values of the phase mask are spatially random.

In an embodiment step b) comprises inverse Fourier transforming and applying the phase mask values to the first data to provide the second data.

Embodiments of the hologram generation algorithm/method can be run sufficiently fast to provide a number, e.g. 40, holograms per video frame, where a video frame is $1/25$ second. It has been found that there is a statistical result that the noise variance of the time average of N images, each with independent noise of some arbitrary distribution, falls as 1/N. Embodiments of a first algorithm embodying the invention can therefore generate, in real time, a set of N holograms per video frame ('subframes') to produce RPFs with independent noise. If the frames are displayed quickly enough then the limited temporal bandwidth of the eye is exploited to impart the effect of noise variance attenuation due to averaging. Embodiments of a second algorithm can produce 2N holograms from N Fourier steps.

According to a further aspect of the invention there is provided a method of providing a pixellated hologram comprising forming first data having amplitude equal to the amplitude of the desired image pixels; inverse Fourier transforming the first data to provide second data; shifting the second data in the real direction in the complex plane sufficiently to form a third data set in which the phase of each data point is small; forming as a fourth data set the magnitude of the third data set; and binarising the fourth data set to form a fifth data set for display as said hologram.

According to a yet further aspect of the invention there is provided a method of providing a pixellated hologram comprising forming first data having amplitude equal to the amplitude of the desired image pixels; inverse Fresnel transforming the first data to provide second data; shifting the second data in the real direction in the complex plane sufficiently to form a third data set in which the phase of each data point is small; forming as a fourth data set the magnitude of the third data set; and binarising the fourth data set to form a fifth data set for display as said hologram.

According to still another aspect of the invention there is provided a method of generating a pixellated holograms, the method comprising forming a first data set, the members of said first data set having respective amplitudes equal to the amplitudes of respective desired pixels; performing an inverse Fourier transform on the first data set to provide second data set; shifting the second data set in the real direction in the complex plane sufficiently to form a third data set in which the phase of each data point is small; forming as a fourth data set the magnitude of the third data set; and binarising the fourth data set to form a fifth data set for display as a said hologram.

The forming step may comprise forming data having identically distributed random phase.

The step of binarisation may comprise thresholding about the median of the fourth data set whereby the fifth data set has dc balance and low reconstruction error.

The display device may comprise a spatial light modulator having a pixellated phase mask imposing phase shifts of substantially 0 and $\pi/2$, wherein the effect of the display device showing a binary hologram in co-operation with the two-phase phase mask simulates a four-phase modulation, wherein each pixel has one of the values [1, j, −1, −j]. Other phase shifts would be possible provided a difference of substantially $\pi/2$ or $n\,\pi/2$ is present between the two levels.

The pixel values of the phase mask may be spatially random.

The method may further comprise applying the phase mask values to the first data to provide the second data.

The image may be a 2 dimensional image. Alternatively the image may be three dimensional.

BRIEF DESCRIPTION OF THE DRAWINGS

Exemplary embodiments of the invention will now be described with reference to the accompanying drawings in which.

DETAILED DESCRIPTION OF CERTAIN EXEMPLARY EMBODIMENTS

Figure 1:
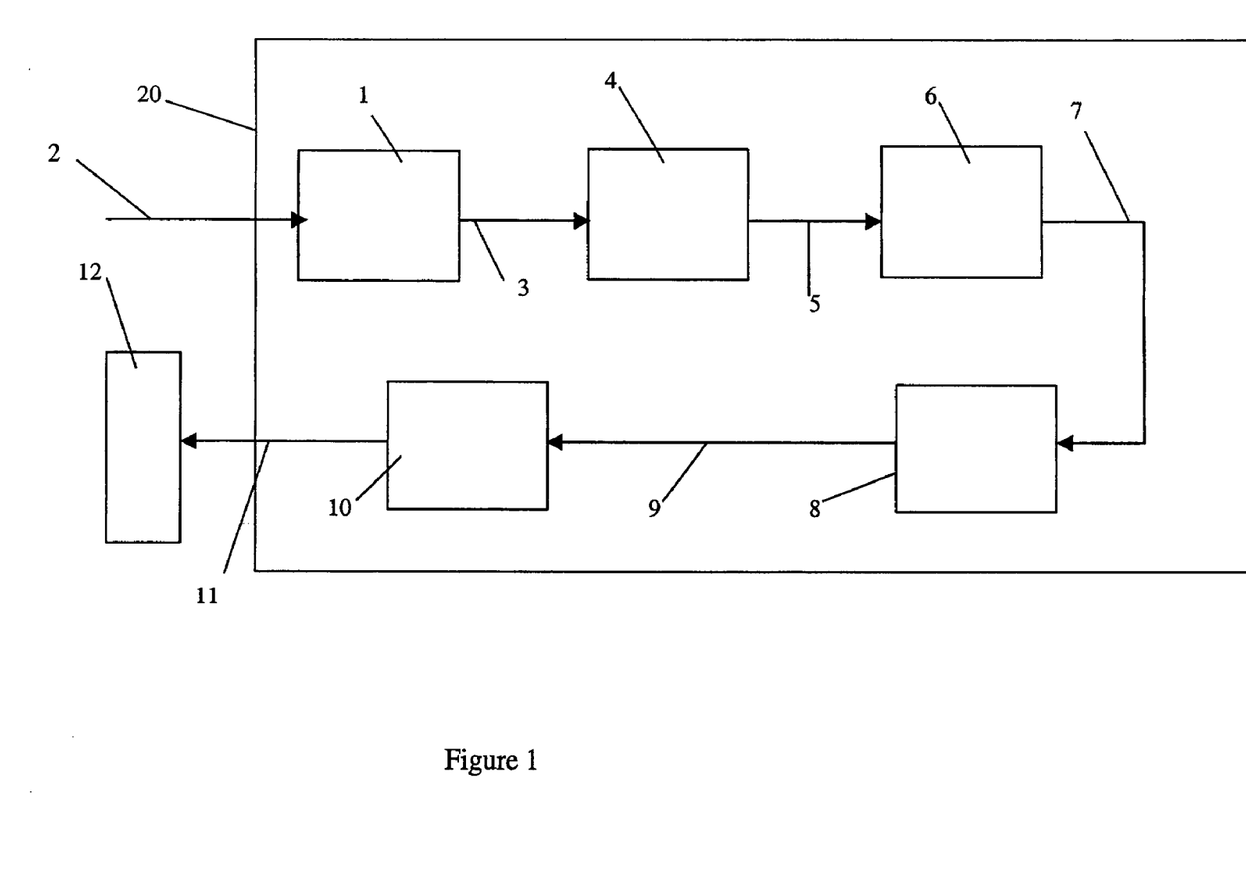
FIG. 1 shows a block schematic drawing of apparatus embodying the invention.
Figure 2A:
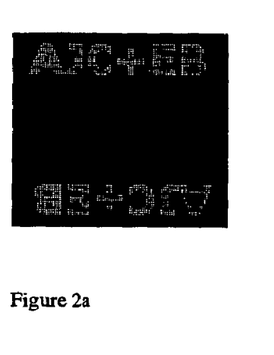
FIG. 2a shows a conjugate image present due to binary SLM.
Figure 2B:
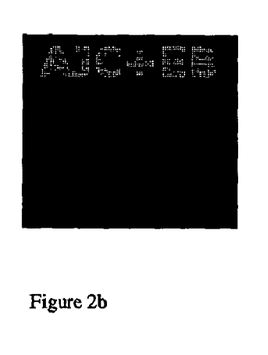
FIG. 2b shows the conjugate image eliminated with phase mask.
Figure 2C:
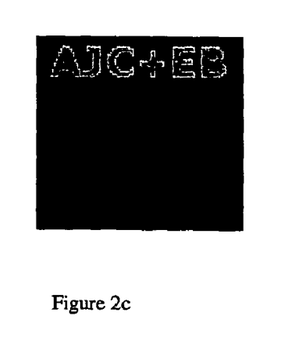
FIG. 2c shows the conjugate image eliminated using Fresnel holography
Figure 3A:
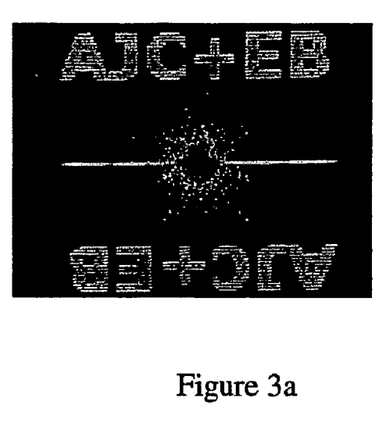
FIG. 3a shows an exemplary replay field produced by an embodiment of a method of the invention.
Figure 3B:
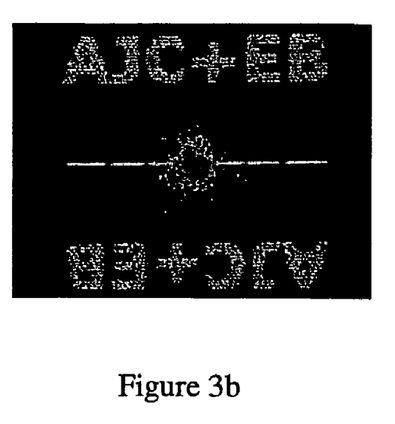
FIG. 3b shows a replay field similar to that of FIG. 3a but produced by direct binary search.

Referring to FIG. 1, a signal (2) representing an p×q pixel input intensity field $T_{xy}$, generated directly from a video signal is input to a processing device (20) having a first processing block (1). The processing device (20) in this embodiment includes a field programmable gate array (FPGA) running code to enable it to perform the required functions. In other embodiments an ASIC is used and in yet others a programmed general purpose computer is used. The first processing block (1) for each said plurality of pixellated holograms, forms a first data set $T_{xy}^{(n)}$ at an output (3) by the expression $T_{xy}^{(n)} = \sqrt{T_{xy}}\exp(j\Phi_{xy}^{(n)})$, so that the first data set $T_{xy}^{(n)}$ has amplitude equal to the amplitude of the desired pixel and identically distributed (i.i.d.) uniformly random phase.

The first data set (3) is applied to a second processing block (4) which forms a second data set $G_{xy}^{(n)}$ such that $G_{xy}^{(n)} = F^{-1}[T_{xy}^{(n)}]$ at output (5) where $F^{-1}$ represents the 2D inverse Fourier transform.

The second data set is then shifted by third processing block (6) in the real direction in the complex plane (i.e. to the right) sufficiently to form a third data set (7) in which the phase of each data point is small. The third processing block (6) forms R as the smallest positive real such that $|G_{xy}^{(n)}| \leq R$ $\forall x,y,n$ and adds a real $\alpha$ where $\alpha \gg R$ to each data item of the second set to form a third set $\alpha + G_{xy}^{(n)}$ at output (7).

The third data set at output (7) is applied to a magnitude-forming fifth processing block (8) performing the function $M_{xy}^{(n)} = |\alpha + G_{xy}^{(n)}|$ such that $M_{xy}^{(n)}$ is output as a fourth data set (9).

The fourth data is then supplied to a binarisation stage (10) performing the function $$H_{xy}^{(n)} = \begin{cases} -1 & \text{if } M_{xy}^{(n)} < Q^{(n)} \\ 1 & \text{if } M_{xy}^{(n)} \geq Q^{(n)} \end{cases}$$

where $Q^{(n)} = \text{median}(M_{xy}^{(n)})$ to form a fifth data set (11) for display as a said hologram.

The fifth data set (11) is supplied to a ferroelectric liquid crystal SLM (12) for display and viewing. Although a ferroelectric liquid crystal spatial light modulator is used in this embodiment other devices, for example including nematic SLMs, OASLMs (optically-addressed spatial light modulators), and also more exotic types of liquid crystal displays such as electroclinic, pi cell, flexoelectric, antiferroelectric, ferrielectric, V-shaped switching cells, and guest-host dye cells may be substituted, in addition to non-liquid crystal technologies such as OLED displays, vacuum fluorescent displays, electroluminescent displays, MEMS devices such as DMDs. The device may be transmissive or reflective.

The presence of only a single computationally intensive step, i.e. the inverse Fourier transform, allows current hardware to generate in real time plural, e.g. 40, holograms per video frame.

In a second embodiment, a modified process generates sets of 2N distinct p×q binary phase holograms $H_{xy}^{(n)}$, each of which produces a replay field that approximates the same target image. The key feature of the process is that the noise fields produced by each hologram are i.i.d., satisfying the conditions above.

The process begins with the specification of a target intensity image $T_{xy}$ and proceeds as follows:
1. Let $T_{xy}^{(n)} = \sqrt{T_{xy}} \exp(j\Phi_{xy}^{(n)})$ where $\Phi_{xy}^{(n)}$ is uniformly distributed between 0 and $2\pi$ for $1 \leq n \leq N$, $1 \leq x \leq p$, $1 \leq y \leq q$
2. Let $G_{xy}^{(n)} = F^{-1}[T_{xy}^{(n)}]$ where $F^{-1}$ represents the 2D inverse Fourier transform operator, for $1 \leq n \leq N$
3. Let $M_{xy}^{(n)} = \Re\{G_{xy}^{(n)}\}$ for $1 \leq n \leq N$
4. Let $M_{xy}^{(n+N)} = \Im\{G_{xy}^{(n)}\}$ for $1 \leq n \leq N$
5. Let $$H_{xy}^{(n)} = \begin{cases} -1 & \text{if } M_{xy}^{(n)} < Q^{(n)} \\ 1 & \text{if } M_{xy}^{(n)} \geq Q^{(n)} \end{cases}$$

where $Q^{(n)} = \text{median}(M_{xy}^{(n)})$ and $1 \leq n \leq 2N$.

Steps 3 and 5 of this process are exactly equivalent to steps 3, 4 and 5 of the first embodiment, but an additional step (number 4 in this process) is added. The holograms $M_{xy}^{(n)}$ produced here are thus exactly the same as the holograms $M_{xy}^{(n)}$ produced by the original algorithm, only here the holograms $M_{xy}^{(n+N)}$ are also provided "for free"—i.e. without a need for further Fourier transform step.

Step 1 forms N targets $T_{xy}^{(n)}$ equal to the amplitude of the supplied intensity target $T_{xy}$, but with i.i.d. uniformly-random phase. Step 2 computes the N corresponding full complex Fourier transform holograms $G_{xy}^{(n)}$. Steps 3, 4 compute the real part and imaginary part of the holograms, respectively. Binarisation of each of the real and imaginary parts of the holograms is then performed in step 5: thresholding around the median of $M_{xy}^{(n)}$ ensures equal numbers of −1 and 1 points are present in the holograms, achieving DC balance (by definition) and also minimal reconstruction error. Hence, for one Fourier transform operation performed upon $T_{xy}$, two binary phase holograms $H_{xy}$ are provided as opposed to one hologram obtained using the process of the first embodiment.

In another embodiment, steps 3-5 perform not a binary quantisation but a quantisation to more than two phase levels. In the latter case, only one hologram is produced per Fourier transform performed upon $T_{xy}$.

Any purely real hologram (such as a binary phase hologram employed in some embodiments) produces a conjugate image in the replay field, reducing the usable area and hence the efficiency by half.

The conjugate image can be removed by generating a four-phase hologram where each pixel takes one of the values [1,j,−1,−j], although such holograms cannot be displayed on an inherently binary device such as a ferroelectric SLM. More than two phase levels can be displayed on a nematic liquid crystal device, but commercially-available device of this type are currently too slow for high frame-rate applications, as provided by the algorithm described above.

However by etching a pixellated phase mask of pixel values 1 and j (thus imposing phase shifts of 0 and $\pi/2$ respectively) on the top surface of a binary-phase SLM the conjugate image can be removed. This is achieved by randomly setting the pixel values of the mask such that the net modulation imposed by the combination of the SLM and phase mask lie in the set [1,j,−1,−j], which provides the extra degree of freedom required to remove the conjugate image (at the expense of additional RPF noise), despite the fact that the SLM itself is binary. This technique has been used in correlator design and is here applied to the display application. Although the pixel values of the mask are random, and thus have "dc balance" in that there are statistically equal numbers of each value of phase shift, the mask itself is fixed and the pixel position of each value of phase shift is known.

In other embodiments, a distribution of phase shifts that is not completely random is used.

To modify the algorithm described above to use a phase mask, the second block (4) is modified to provide a $G_{xy}^{(n)}$ such that $$G_{xy}^{(n)} = \frac{F^{-1}[T_{xy}^{(n)}]}{P_{xy}}$$

where $P_{xy}$ defines the phase mask, which has been generated randomly so that each pixel has an equal probability of taking the value 1 or j.

Figure 4:
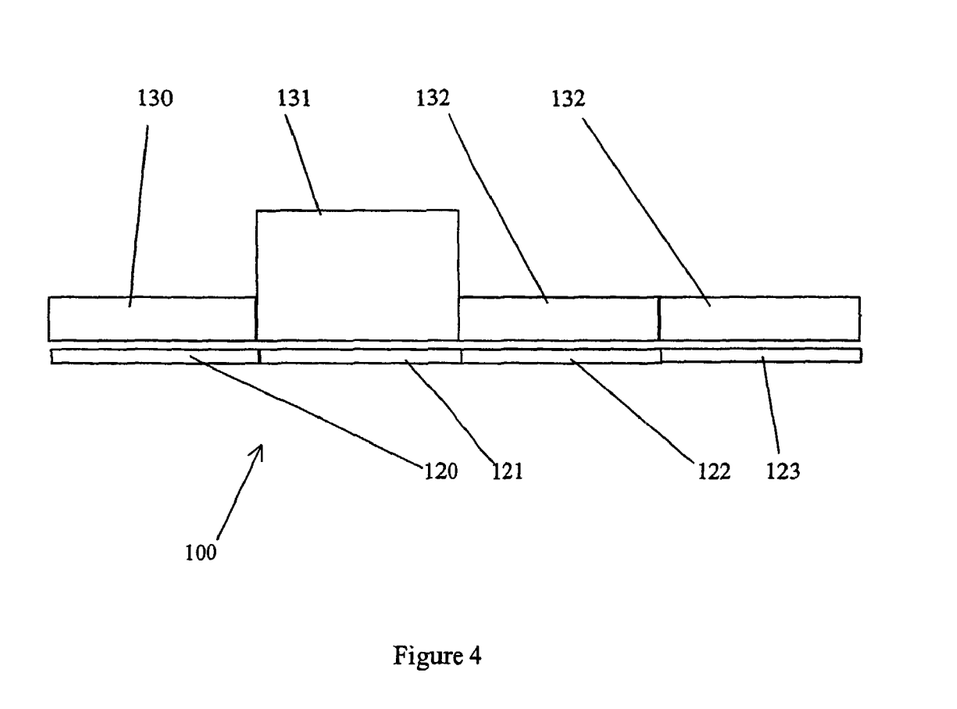
FIG. 4 shows a partial cross-sectional view through an SLM having a pixellated phase mask imposing phase shifts of 0 and $\pi/2$.

Referring to FIG. 4, a cross-sectional view through a part of a binary SLM (100) is shown. The SLM (100) has plural pixels (120-123) in the drawing although it will be understood that the pixels are in fact arranged in a two dimensional matrix. Each pixel (120-123) is capable of being electrically controlled so as to provide a phase shift of 0 or π. Each pixel (120-123) of the SLM has a respective phase-mask pixel (130-133) overlying it and disposed in correspondence with it. As will be seen in the Figure the first, third and fourth phase mask pixels (130, 132, 133) have a relatively low thickness whereas the second phase mask pixel (131) has a relatively high thickness. The thickness difference is selected on the basis of the material of the phase mask and on the basis of the wavelength of the light used. The selection is such that the light passing through the thicker pixels (131) is subject to a phase shift of π more than the light passing through the thinner pixels (130,132,133).

Where the SLM or like device is reflective, the light will pass twice through the phase mask, and corresponding changes in thickness will be needed.

In the present embodiment the phase mask is formed as a coating on the SLM (100). It would of course be possible to use other arrangements for example use two substantially identical SLMs with one providing a data display and the other forming the phase mask.

To evaluate the efficacy of this technique in simulation, holograms were generated for the two test patterns with each hologram being replicated twice, the replication step being performed between steps 2 and 3 in the algorithm. The replay fields formed demonstrated that the conjugate image is removed effectively.

The foregoing discussion relates to producing desired 2D structure in the far field using Fourier holograms. The method can also be extended to produce Fresnel holograms for the production of structure in the near field, which is particularly useful for a lensless optical configuration. Fresnel holography offers a further advantage of enabling lensless projection, since the hologram itself encodes the focussing element, giving an obvious weight, cost and size saving over conventional projective display systems.

The discrete Fresnel transform is closely related to the Fourier transform, and describes the near field $T_{xy}$ produced at distance f by the hologram $G_{xy}$ (of dimensions X by Y and corresponding pixel sizes $\Delta_x$ and $\Delta_y$) when illuminated with coherent light of wavelength λ. When imaging not too close to the hologram the transform is given by $$T_{xy} = \frac{j}{\lambda f} \exp\left(-j\lambda\pi f\left[\frac{x^2}{X^2\Delta_x^2} + \frac{y^2}{Y^2\Delta_y^2}\right]\right) \times$$
$$F\left[G_{xy}\exp\left(\frac{-j\pi}{\lambda f}(x^2\Delta_x^2 + y^2\Delta_y^2)\right)\right]$$

with corresponding inverse transform $$G_{xy} = \exp\left(\frac{j\pi}{\lambda f} \times (x^2\Delta_x^2 + y^2\Delta_y^2)\right) \times$$
$$F^{-1}\left[T_{xy}\frac{\lambda f}{j}\exp\left(j\pi\lambda f\left[\frac{x^2}{X^2\Delta_x^2} + \frac{y^2}{Y^2\Delta_y^2}\right]\right)\right]$$

Hence if processing block (4) provides a $G_{xy}^{(n)}$ such that $$G_{xy} = \exp\left(\frac{j\pi}{\lambda f} \times (x^2\Delta_x^2 + y^2\Delta_y^2)\right) \times$$

$$F^{-1}\left[T_{xy}\frac{\lambda f}{j}\exp\left(j\pi\lambda f\left[\frac{x^2}{X^2\Delta_x^2} + \frac{y^2}{Y^2\Delta_y^2}\right]\right)\right]$$

Fresnel holograms are generated that form the target image at the specified distance f from the hologram.

The techniques described may be modified for the generation of 3D holograms for 3D holographic video display. A 3D hologram of an object is simply a recording of the complex electromagnetic field (produced by light scattered by the object) at a plane in front of the object. By Huygens' principle, if the EM field distribution on a plane P is known, Huygens wavelets can be propagated through space to evaluate the field at any point in 3D space. As such, the plane hologram encodes all the information necessary to view the object from any position and angle in front of the plane and hence is, in theory, optically indistinguishable from the object.

In practice, limitations in the pixel resolution of the recording medium restricts the viewing angle θ which, as in the 2D case, varies inversely with the pixel size Δ.

Consider a plane, perpendicular to the z-axis, intersecting the origin, and one point source emitter of wavelength λ and amplitude A at position (X, Y, Z) behind it. The field F present at position (x, y) on the plane—i.e. the hologram—is given by $$F(x, y) = \frac{ZA}{j\lambda r^2}\exp\left(\frac{2\pi j}{\lambda}\right)$$

with $r = \sqrt{(x-X)^2 + (y-Y)^2 + Z^2}$

If a 3D scene is regarded as M sources of amplitude $A_i$ at $(X_i, Y_i, Z_i)$, the linear nature of EM propagation results in the total field hologram F being $$F(x, y) = \sum_{i=1}^{M} \frac{Z_i A_i}{j\lambda r_i^2}\exp\left(\frac{2\pi j}{\lambda}r_i\right)$$

with $r_i = \sqrt{(x-X_i)^2 + (y-Y_i)^2 + Z_i^2}$

If F(x, y) is to be sampled over the region $x_{min} \leq x \leq x_{max}$, $y_{min} \leq y \leq y_{max}$ to form an m×m hologram $F_{xy}$, there is obtained:

$$F_{xy} = \sum_{i=1}^{M} \frac{Z_i A_i}{j\lambda r_i^2}\exp\left(\frac{2\pi j}{\lambda}r_i\right)$$

with $r_i = \sqrt{\left(x_{min} + x\frac{x_{max}-x_{min}}{m} - X_i\right)^2 + \left(y_{min} + y\frac{y_{max}-y_{min}}{m} - Y_i\right)^2 + Z_i^2}$ There is thus presented an algorithm (with an SLM phase mask) that generates N full-parallax 3D holograms $H_{xy}^{(n)}$ for a given array of point sources, as above.

Let $$F_{xy}^{(n)} = \sum_{i=1}^{M} \frac{Z_i A_i}{j \lambda r_i^2} \exp\left(\Phi_i^{(n)} j + \frac{2\pi j}{\lambda} r_i\right)$$

with $r_i$ as above where $\Phi_i^{(n)}$ is uniformly distributed between 0 and $2\pi$ for $1 \leq n \leq N$, $1 \leq i \leq M$ Let $$G_{xy}^{(n)} = \frac{F_{xy}^{(n)}}{P_{xy}},$$

where $P_{xy}$ is the precomputed [1,j] phase mask as described in the previous section.

Let R be the smallest positive real such that $|G_{xy}^{(n)}| \leq R$ $\forall x,y,n$. R exists since each value taken by $G_{xy}^{(n)}$ is finite and so $G_{xy}^{(n)}$ has compact support Let $M_{xy}^{(n)} = |\alpha + G_{xy}^{(n)}|$, where $\alpha$ is real and very much greater than R.

$$\text{Let } H_{xy}^{(n)} = \begin{cases} -1 & \text{if } M_{xy}^{(n)} < Q^{(n)} \\ 1 & \text{if } M_{xy}^{(n)} \geq Q^{(n)} \end{cases}$$

where $Q^{(n)} = \text{median}(M_{xy}^{(n)})$

Alternatively, to obtain two holograms per Fourier transform then the preceding three steps are replaced by the following:

Let $M_{xy}^{(n)} = \Re\{G_{xy}^{(n)}\}$ for $1 \leq n \leq N$
Let $M_{xy}^{(n+N)} = \Im\{G_{xy}^{(n)}\}$ for $1 \leq n \leq N$ $$\text{Let } H_{xy}^{(n)} = \begin{cases} -1 & \text{if } M_{xy}^{(n)} < Q^{(n)} \\ 1 & \text{if } M_{xy}^{(n)} \geq Q^{(n)} \end{cases}$$

where $Q^{(n)} = \text{median}(M_{xy}^{(n)})$ and $1 \leq n \leq 2N$

To test this algorithm, there is considered the calculation of N=8 holograms of resolution 512×512 and size 2 mm×2 mm centred at the origin of plane P, giving a pixel size of $\Delta=4$ μm and hence a viewing angle of around 9 degrees under coherent red illumination ($\lambda$=632nm). The 3D scene used was a set of 944 point sources that formed a wireframe cuboid of dimensions 12 cm×12 cm×18 cm, located at a distance of 1.91 m from the plane.

The simulated RPFs produced were calculated by propagating Huygens wavelets from the N holograms in turn through a pinhole aperture K onto a virtual screen (a plane perpendicular to the line from the centre of the cube to the pinhole), and recording the time-averaged intensity distribution on the screen.

Unfortunately, in contrast with algorithm described for 2D, the computation of step one in the 3D algorithm above may not be realisable in real time with current consumer hardware for a scene with anything but a very small number of point sources. However, the required holograms generated by the algorithm can be computed and stored for recall in real time. Much more powerful computation may be needed for real-time three-dimensional hologram generation, although it has been found possible to optimise the calculations in a way that suggests that such computation may not be needed.

The holographic projection method detailed above is realisable in hardware. At the time of writing, commercially available FPGAs (field programmable gate arrays) and other programmable hardware such as DSPs can be programmed using commercially available or custom code to compute 512×512 Fourier transforms at a rate of at least 2400 frames/sec, sufficient for full-colour video (25 frames/sec, 3 colour planes, N=32). For the display device, a commercially available SLM can display a sufficient frame rate at at least 512×512 resolution. It is possible to use separate illumination devices where multiple colours are needed—for example for a full colour display. Alternatively a single device capable of multiple colour output can be used instead. Two significant design issues have been identified.

Firstly, since optical loss in the phase holographic element is small and total energy is conserved, nearly all of the incident optical energy is routed into the RPF. Therefore, a target RPF with fewer "on" points will appear brighter than one with many, assuming total energy is distributed approximately evenly between each "on" pixel in the RPF. As a result, a controller causes the intensity of the source to be modulated correspondingly to achieve a uniform overall brightness between frames, in accordance with the number of "on" points in each frame. Direct amplitude modulation of a laser is undesirable due to nonlinearity, and thus in an embodiment such amplitude modulation is replaced by pulse-width modulation within each 400 μs pulse interval with a duty cycle proportional to the desired brightness to achieve the required average intensity.

Secondly, a design issue comes from the relationship between RPF size and illumination wavelength. This is overcome in one embodiment by a lens system corrected for chromatic aberration at the three wavelengths of the sources and in another by using Fresnel holography to build compensation for this effect directly into the holograms.

The results of the approach of the invention show in simulation a RPF exhibiting a noise energy of two orders of magnitude lower than direct binary search (DBS), with calculation times six orders of magnitude faster. Experimental results are in agreement with the theory, and show a previously undemonstrated level of contrast and accuracy for a holographically generated image even with a test device that is a very old design of ferroelectric SLM.

The invention has been described above in the context of binary operation and binary SLMs. However it will be understood that the algorithm itself is capable of extension to more than 2 phase levels.

An alternative to step 5 set out above is to use error diffusion. As known to those skilled in the art, Error Diffusion is a way of converting a continuous function to a quantised function, whilst ensuring that the noise resulting from this operation is moved to an area of the replay field which does not impinge upon the desired image.

Although embodiments of the invention have been described, these are not limiting on the invention itself. This extends to the full scope of the appended claims.

The invention claimed is:

1. A method of displaying a holographically generated video, said video comprising a plurality of video frames, the method comprising providing for each frame a respective sequential plurality of holograms to reconstruct the frame, and displaying to a human observer the holograms of each of the plural video frames on a diffractive display device for viewing the replay field thereof, wherein the noise fields of said holograms are independent and identically distributed (i.i.d.), and wherein said holograms are displayed quickly enough for the limited temporal bandwidth of the eye of said observer to impart an effect of noise variance attenuation due to averaging, whereby the noise variance of each frame is perceived by said human observer as attenuated by averaging across said plurality of holograms, wherein a process of providing said plurality of holograms comprises:

receiving an input intensity image;

forming n target intensity images each equal to an amplitude of said input intensity image, and each having i.i.d. uniformly-random phase;

computing n full complex Fourier transform holograms respectively corresponding to said n target intensity images, a said Fourier transform hologram comprising a real part and an imaginary part; and quantizing said real and imaginary parts of each of said Fourier transform holograms to more than two phase levels to provide said plurality of holograms to reconstruct said frame, wherein said reconstructed frame lacks a conjugate image.

2. A method according to claim 1 wherein the image is a 2 dimensional image.

3. Apparatus constructed and arranged to display a holographically generated video, said video having a plurality of video frames, the apparatus comprising processing means arranged to provide for each frame a respective sequential plurality of holograms to reconstruct the frame, and a diffractive display device arranged to receive the sequential plurality of holograms of each frame and to display to a human observer the holograms of each of the plural video frames of the video for viewing the replay field thereof, wherein the noise fields of said holograms are independent and identically distributed (i.i.d.), and wherein said holograms are displayed quickly enough for the limited temporal bandwidth of the eye of said observer to impart an effect of noise variance attenuation due to averaging, whereby the noise variance of each frame is perceived by said human observer as attenuated by averaging across said plurality of holograms, wherein said processing means is further configured to:

receive an input intensity image;

form n target intensity images each equal to an amplitude of said input intensity image, and each having i.i.d. uniformly-random phase;

compute n full complex Fourier transform holograms respectively corresponding to said n target intensity images, a said Fourier transform hologram comprising a real part and an imaginary part; and quantize said real and imaginary parts of each of said Fourier transform holograms to more than two phase levels to provide said plurality of holograms to reconstruct said frame, wherein said reconstructed frame lacks a conjugate image.

4. A method according to claim 1, further comprising modulating a light intensity of a light source illuminating said diffractive display device in accordance with the number of on pixels in said replay field to achieve substantially uniform overall brightness between said frames.

5. A method according to claim 1, wherein said diffractive display device comprises a display device able to display more than two phase levels.

6. A method according to claim 1, wherein said holographically generated video is multi-colour video.

7. Apparatus according to claim 3, wherein said apparatus is further configured to modulate a light intensity of a light source illuminating said diffractive display device in accordance with the number of on pixels in said replay field to achieve substantially uniform overall brightness between said frames.

8. Apparatus according to claim 3, wherein said diffractive display device comprises a display device able to display more than two phase levels.

9. Apparatus according to claim 3, wherein said holographically generated video is multi-colour video.

10. Apparatus according to claim 3, wherein the image is a 2 dimensional image.

* * * * *